US010839420B2

(12) United States Patent
Chen et al.

(10) Patent No.: US 10,839,420 B2
(45) Date of Patent: Nov. 17, 2020

(54) CONSTRAINED LARGE-DATA MARKDOWN OPTIMIZATIONS BASED UPON MARKDOWN BUDGET

(71) Applicant: International Business Machines Corporation, Armonk, NY (US)

(72) Inventors: Jun Lei Chen, Shanghai (CN); Xiao Chun Li, Shanghai (CN); Emily A. Port, San Francisco, CA (US); Siqun Wang, San Carlos, CA (US); Emrah Zarifoglu, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 14/814,743

(22) Filed: Jul. 31, 2015

(65) Prior Publication Data

US 2017/0032415 A1    Feb. 2, 2017

(51) Int. Cl.
*G06Q 30/00* (2012.01)
*G06Q 30/02* (2012.01)

(52) U.S. Cl.
CPC ................... *G06Q 30/0249* (2013.01)

(58) Field of Classification Search
CPC ..................................................... G06Q 30/02
See application file for complete search history.

(56) References Cited

U.S. PATENT DOCUMENTS 7,085,734 B2    8/2006    Grant et al.
7,287,000 B2    10/2007   Boyd et al.
(Continued)

FOREIGN PATENT DOCUMENTS

| JP | 2014081925 A | * | 5/2014 | ............ G06F 11/32 |
| JP | 2014126940 A | * | 7/2014 | ............ G06F 13/00 |
| JP | 2015088195 A | * | 5/2015 | ............ G16H 10/60 |

OTHER PUBLICATIONS

Oracle® Retail Markdown Optimization User Guide Release 13.0 (Apr. 2008) . Retrived online Feb. 14, 2019. https://docs.oracle.com/cd/E12578_01/mdo/pdf/130/mdo-130-ug.pdf (Year: 2008).*

(Continued)

*Primary Examiner* — James A Reagan
(74) *Attorney, Agent, or Firm* — William H. Hartwell

(57) ABSTRACT

A markdown budget user interface is provided that implements access to large-scale computational resources capable of concurrently manipulating a number of multi-million item data sets and that allows a retailer to specify inputs. The inputs include a markdown budget constraint that applies across all retailer stores, a group of store-product data sets that each include initial prices and markdown start prices of different combinations of products within all of the retailer stores, and a markdown objective, selected from a group including profit, revenue, and sales volume, to be maximized within the markdown budget constraint. The inputs are received from the retailer using the markdown budget user interface and the large-scale computational resources are invoked to determine a markdown recommendation that includes an indication of the store-product data sets that satisfy both the markdown budget constraint and the markdown objective. The markdown recommendation is provided to the retailer.

20 Claims, 5 Drawing Sheets

(56) References Cited

U.S. PATENT DOCUMENTS

| | | | |
|---|---|---|---|
| 7,822,692 B2 | 10/2010 | Zuerl et al. | |
| 7,974,851 B2 | 7/2011 | Veit | |
| 7,996,330 B2 | 8/2011 | Veit et al. | |
| 8,000,996 B1 | 8/2011 | Sanli et al. | |
| 8,639,558 B2 | 1/2014 | Desai et al. | |
| 2011/0138396 A1* | 6/2011 | Chen | G06F 9/5066 718/105 |
| 2012/0290460 A1* | 11/2012 | Curry, Jr. | H04L 41/5029 705/37 |
| 2013/0103458 A1 | 4/2013 | Gupte et al. | |
| 2013/0166697 A1* | 6/2013 | Manning | H04L 69/18 709/219 |
| 2014/0200964 A1 | 7/2014 | Hassanzadeh et al. | |
| 2015/0120409 A1 | 4/2015 | Bhattacharya et al. | |
| 2015/0178805 A1* | 6/2015 | Curry, Jr. | H04L 41/5029 705/26.41 |
| 2015/0333977 A1* | 11/2015 | Box | G06F 9/5077 709/226 |

OTHER PUBLICATIONS

Oracle® Retail Markdown Optimization Implementation Guide Release 13.2. (Jul. 2010). Retrieved online Feb. 9, 2020. https://docs.oracle.com/cd/E12578_01/mdo/pdf/132/mdo-132-imp.pdf (Year: 2010).*

* cited by examiner

400

402 — PROVIDE A MARKDOWN BUDGET USER INTERFACE THAT IMPLEMENTS ACCESS TO LARGE-SCALE COMPUTATIONAL RESOURCES CAPABLE OF CONCURRENTLY MANIPULATING EACH OF A PLURALITY OF MULTI-MILLION ITEM DATA SETS AND THAT ALLOWS A RETAILER TO SPECIFY INPUTS COMPRISING A MARKDOWN BUDGET CONSTRAINT THAT APPLIES ACROSS ALL RETAILER STORES, A PLURALITY OF STORE-PRODUCT DATA SETS THAT EACH COMPRISE INITIAL PRICES AND MARKDOWN START PRICES OF DIFFERENT COMBINATIONS OF PRODUCTS WITHIN ALL OF THE RETAILER STORES, AND A MARKDOWN OBJECTIVE SELECTED FROM A GROUP CONSISTING OF PROFIT, REVENUE, AND SALES VOLUME TO BE MAXIMIZED WITHIN THE MARKDOWN BUDGET CONSTRAINT

404 — RECEIVE FROM THE RETAILER VIA THE MARKDOWN BUDGET USER INTERFACE THE INPUTS COMPRISING THE MARKDOWN BUDGET CONSTRAINT, THE PLURALITY OF STORE-PRODUCT COMBINATION DATA SETS, AND THE MARKDOWN OBJECTIVE

406 — INVOKE THE LARGE-SCALE COMPUTATIONAL RESOURCES VIA THE MARKDOWN BUDGET USER INTERFACE TO DETERMINE A MARKDOWN RECOMMENDATION THAT COMPRISES AN INDICATION OF THE STORE-PRODUCT DATA SETS THAT CONCURRENTLY SATISFY BOTH THE MARKDOWN BUDGET CONSTRAINT AND THE MARKDOWN OBJECTIVE

408 — PROVIDE, TO THE RETAILER VIA THE MARKDOWN BUDGET USER INTERFACE, THE MARKDOWN RECOMMENDATION THAT COMPRISES THE INDICATION OF THE STORE-PRODUCT DATA SETS THAT CONCURRENTLY SATISFY BOTH THE MARKDOWN BUDGET CONSTRAINT AND THE MARKDOWN OBJECTIVE

FIG. 4

CONSTRAINED LARGE-DATA MARKDOWN OPTIMIZATIONS BASED UPON MARKDOWN BUDGET

BACKGROUND

The present invention relates to large data transformation and processing. More particularly, the present invention relates to constrained large-data markdown optimizations based upon markdown budget.

Retailers of products include entities that sell clothing, home products, entertainment products, and other forms of consumer products. Larger multinational retailers may have retail establishments in several different states and several different countries.

SUMMARY

A computer-implemented method includes providing a markdown budget user interface that implements access to large-scale computational resources capable of concurrently manipulating each of a plurality of multi-million item data sets and that allows a retailer to specify inputs comprising a markdown budget constraint that applies across all retailer stores, a plurality of store-product data sets that each comprise initial prices and markdown start prices of different combinations of products within all of the retailer stores, and a markdown objective selected from a group consisting of profit, revenue, and sales volume to be maximized within the markdown budget constraint; receiving from the retailer via the markdown budget user interface the inputs comprising the markdown budget constraint, the plurality of store-product data sets, and the markdown objective; invoking the large-scale computational resources via the markdown budget user interface to determine a markdown recommendation that comprises an indication of the store-product data sets that satisfy both the markdown budget constraint and the markdown objective; and providing, to the retailer via the markdown budget user interface, the markdown recommendation that comprises the indication of the store-product data sets that satisfy both the markdown budget constraint and the markdown objective.

A system that performs the method and a computer program product that causes a computer to perform the method are also described.

BRIEF DESCRIPTION OF THE DRAWINGS

FIG. 4 is a flow chart of an example of an implementation of a process for constrained large-data markdown optimizations based upon markdown budget according to an embodiment of the present subject matter.

DETAILED DESCRIPTION

Figure 1:
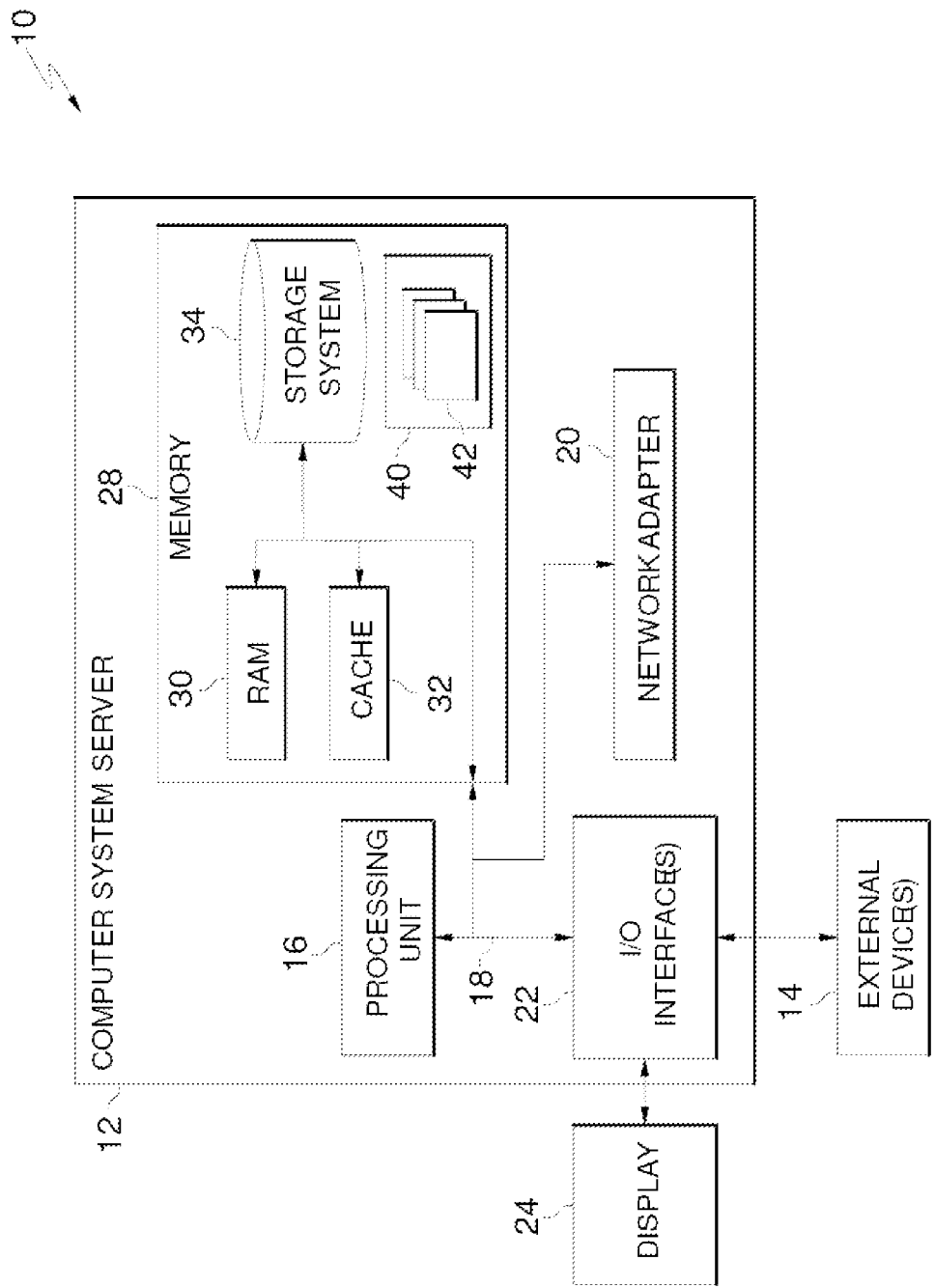
FIG. 1 depicts a cloud computing node according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides constrained large-data markdown optimizations based upon markdown budget. The present technology solves a recognized large data analysis problem by providing technology that includes a new form of computing platform that performs computational processing in association with complex multi-site computing environments. The technology described herein involves processing and optimization of information that is too large to be processed by conventional computing devices. For example, a retailer may have hundreds of stores across which there may be hundreds of different products, which may result in millions of store-product combinations of items that the retailer wants to price according to a markdown budget constraint as defined herein across all stores. However, attempting to perform a markdown optimization across all store-products (e.g., millions) for this very large set of store-product combinations creates a complex data processing challenge. The technology described herein solves this computing problem by providing a new technique of data manipulation and data transformation within a new large-scale computing platform to derive data optimizations across this very large data set of individual store-product combinations. The technology described herein solves this large-data problem that, again, is not supported by previous computing platforms.

The technology described herein operates by providing a markdown budget user interface that implements access to large-scale computational resources capable of concurrently manipulating each of a plurality of multi-million item data sets and that allows a retailer to specify a variety of inputs. The inputs include a markdown budget constraint that applies across all retailer stores, a group of store-product data sets that each include initial prices and markdown start prices of different combinations of products within all of the retailer stores, and a markdown objective, selected from a group including profit, revenue, and sales volume, to be maximized within the markdown budget constraint. The inputs are received from the retailer via the markdown budget user interface and the large-scale computational resources are invoked to determine a markdown recommendation that includes an indication of the store-product data sets that satisfy both the markdown budget constraint and the markdown objective. The markdown recommendation is provided to the retailer via the markdown budget user interface.

A markdown schedule is a series of planned price reductions implemented over a relatively short time interval, with the express purpose of managing sales to reduce/eliminate inventory of a product in a cost-effective manner. Markdown pricing is particularly critical for retailers that sell seasonal, trend-based, or other short-life-cycle products.

A markdown budget is a constraint from which a markdown recommendation may be provided for a planned set of price reductions associated with a markdown schedule for certain store-product data sets over time. The set of scheduled markdowns for certain of the store-product data sets are selected to satisfy both the markdown budget constraint and a markdown objective (e.g., the latter being a goal to maximize profit, revenue, sales volume, etc.) specified by the retailer. The selected set of scheduled markdowns for certain of the store-product data sets may be applied at routine intervals over time to achieve the markdown objective within the markdown budget.

A "markdown dollar" represents a cost or lost revenue for any given markdown in a set or sequence of markdowns over time. As such, retailers may limit the total markdown dollars as part of their respective markdown budget. If the total markdown dollars from a particular schedule (recommendation) of price reductions exceeds the markdown budget, the markdown recommendation may not be considered satisfactory even if it meets the markdown objective.

The technology described herein may improve computational processing of these very large data sets by transforming cost and pricing data from the store-product level into different data, and thereby formulating new data that may be processed to arrive at efficient store-product markdown solutions for management of markdown budget constraints. As such, data computational processing improvement may be achieved by use of the technology described herein.

Using the technology described herein, the total markdown dollar (cost of price reductions) may be limited to the markdown budget received from retailers. This may be achieved based upon markdown recommendations from an initial markdown optimization. Subsequent processing may be performed to select which store-product combinations (of potentially millions of store-product specific items) are designated to use the markdown recommendations over time and to select which store-products are designated to use a markdown start price. The markdown start price is an initial markdown relative to a base initial price ("base normal price" as defined below). The derived parameters and results of the calculation may be displayed on a new user interface for the retailers.

The technology described herein uses a specific sequence of processing phases and data transformations to optimize data analysis while considering the total budget across all store-products level (e.g., millions). The final result more closely approximates a maximal/optimal value of the specified markdown objective, while satisfying the specified markdown budget constraint(s).

As described in more detail below, the processing phases include determining for each of multiple store-product combinations (data sets) a "value density." As described in more detail below, the value density of each store-product combination quantifies a relative priority of store-product combinations according to their respective contributions/effectiveness at achieving a particular objective (e.g., maximize profit) within a given markdown budget constraint. The store-product combinations are prioritized/sorted according to their value densities, and iteratively accumulated into a set of store product combinations that are recommended to satisfy the markdown budget constraint and objective across the set of store-product combination choices and all stores.

A subsequent processing phase selects which store-products combinations (e.g., millions) are to be designated to use the markdown recommendation and which store-products combinations are to be designated to use the markdown start price, which provides a technique to retain more profit/revenue/volume under the specified budget constraint. With the selections of the designations for the respective store-products established, reports may be generated on a new user interface that contain the information of the markdown dollars and the markdown budget at the store-product level. The report informs the retailer of the basis and results by which the store-product combinations have been selected for the given markdown recommendation(s).

The technology described herein operates by manipulating and transforming data across a large data set according to a sequence of transformational phases. Each of the transformational phases is described in more detail below. Different store-product groups may be specified for consideration and optimization across the large store-product data set, and each group may be processed as described in more detail below.

As an introduction to the sequence of transformational phases, the transformational phases include, for each store-product group, calculation of a base dollar, calculation of a markdown dollar, calculation of a base objective value, and calculation of a markdown objective value, followed by a detailed sequence of processing steps to calculate a value density for each store-product group. Again, the value densities of the different store-product combinations represent the effectiveness/contribution (value) of the respective store-product combinations at contributing to the markdown objective (e.g. maximize profit) within the particular markdown budget constraint. As such, store-product combinations with higher value densities contribute more to the objective within the particular markdown budget constraint than store-product combinations with lower value densities.

With the value densities determined for each store-product group, the value densities may be prioritized and sorted from highest to lowest, and store-product combinations may be selected for markdown according to the markdown budget constraint provided by the retailer. It should be noted that by iteratively selecting/choosing and accumulating store-product combinations from highest to lowest value density, the objective of maximizing the particular goal (e.g., profit) within the markdown budget constraint may be achieved.

It should be understood that the respective transformational phases are each performed across all stores, resulting in large volumes of data that are manipulated and transformed according to the techniques described herein. The summations within the equations herein are across all stores for a particular retailer, again with the understanding that multiple product groupings may be processed concurrently.

The initial examples to derive the value density are illustrated for one such product group, with the understanding that the same technical processing may be performed for multiple groups concurrently by use of the advanced computational platform described herein.

Product groups may be partitioned as appropriate for a given implementation. For example only, product groups may include office supplies, perishables, or any other groupings appropriate for a given implementation. Product groups may further be granular, with multiple product groups within a given category, such as office supplies.

Regarding calculation of the base dollar, the term "base dollar" represents a dollar amount coming out of sales between a markdown start price and a base normal price, and as such represents the predicted reduction in sales (i.e., a cost or lost-revenue). The "base normal price" or "initial price" represents the price prior to consideration of any markdowns. A "base volume" represents a predicted sales volume at the markdown start price. The prediction of the base volume at the markdown start price may be based upon historical sales data. As an example, a markdown prediction model may be formed using a demand (sales-volume) prediction relationship, where the form and coefficients of the markdown prediction model are derived from historical data. The markdown start price represents the initial markdown price in a series of potential markdown prices.

When a product is sold at a discounted/marked down price, a sales volume at that markdown price may be determined. This sales volume may be multiplied by the difference between the base normal price and the discounted price and lost dollars over all stores may be determined.

In view of the above, the base dollar is defined as a summation across all stores of a quantity equal to the initial price minus the markdown start price, with that quantity multiplied by the base volume. It should be noted that the technology described herein operates successively over time to re-evaluate current input values. For example, each week for which an iteration of processing is performed, a new markdown price may be determined/recommended and used as the markdown start price in the next iteration. As such, a current markdown start price during any processing phase may be different from an initial markdown start price. The base dollar may be set to zero (0) if the markdown start price is equal to the initial price, and the markdown start price should be no higher than the initial price.

The technology described herein receives the initial price and the markdown start price from a retailer, and from those inputs predicts the base volume at the markdown start price using the markdown prediction system described herein. The base dollar, initial price, markdown start price, and base volume are each store-product level values (e.g., millions of potential values).

It should be noted that the examples described below in certain tables show the product first and store second for the different store-product combinations for convenience of representing the data. As such, the ordering of the data may be changed as appropriate for a given implementation.

The following Equation (1) represents processing that may be performed to determine the base dollar.

$$\text{Base dollar} = \Sigma[(\text{initial price} - \text{markdown start price}) * \text{base volume}] \quad \text{Equation (1): Base Dollar Determination}$$

Again, the summation (e.g., "$\Sigma$") for this and all equations described herein are across all store-products for a given retailer (very large data set).

The following Table (1) provides an example base dollar determination across two stores and two products for purposes of description, with the understanding that implementation of the present technology may include millions of store-product combinations:

TABLE (1)

Store-Product Base Dollar Example

| Product | Store | Initial Price | Markdown Start Price | Base Volume | Base Dollar (store-product) |
|---|---|---|---|---|---|
| Product A | Store A | $2.30 | $2.20 | 200 | $20.00 |
| Product A | Store B | $2.70 | $2.60 | 180 | $18.00 |
| Product B | Store A | $4.30 | $4.30 | 100 | 0 |
| Product B | Store B | $4.70 | $4.60 | 80 | $ 8.00 |

As can be seen from Table (1), the base dollar, which again represents cost or lost-revenue for a markdown, is determined across a set of all store-product combinations (again, potentially millions in actual processing). For the Product A/Store A combination, the initial price is two dollars and thirty cents ($2.30), with a markdown start price of two dollars and twenty cents ($2.20), which represents a ten cent ($0.10) markdown from the initial price. The base volume is two hundred (200) units of Product A in Store A, and if all are sold the base dollar, which again is the cost of the initial markdown relative to no markdown, is twenty dollars ($20.00). Similar analysis may be applied to the other store-product combinations within Table (1).

Further, for purposes of the description of the value densities further below, it is noted that the sum/total of the base dollar is equal to forty-six dollars ($46.00). This value is the sum of the far right column in Table (1) above.

Regarding calculation of the markdown dollar, the "markdown dollar" is defined as a summation across all stores of a quantity equal to the initial price minus the current markdown price (which may be different from the markdown start price), with that quantity multiplied times the markdown volume when using a markdown recommendation. The "markdown volume" represents the predicted volume at the current markdown price, which may be different from the base volume. As with the base volume, the prediction of the markdown volume at the current markdown price may be based upon historical sales data. Additionally, the markdown prediction model may be again utilized to derive the predicted markdown volume at the current markdown price.

In preparation for this phase of processing, an initial price is again received from the retailer and the current markdown price is obtained (e.g., from a markdown recommendation of a previous iteration). The markdown volume may then be predicted at that markdown price, again across all store-product combinations. As such, dimensionally, each of the markdown dollar, the initial price, the markdown price, and the predicted markdown volume are all store-product level in granularity and form a very large set of data values for predictions of the markdown sales volume that may be performed using the technology described herein.

The following Equation (2) represents processing that may be performed to determine the markdown dollar.

$$\text{Markdown dollar} = \Sigma[(\text{initial price} - \text{markdown price}) * \text{markdown volume}] \quad \text{Equation (2): Markdown Dollar Determination}$$

Again, the summation (e.g., "$\Sigma$") for this and all equations described herein are across all store-products for a given retailer (very large data set).

The following Table (2) provides an example markdown dollar determination across two stores and two products for purposes of description, with the understanding that implementation of the present technology may include millions of store-product combinations:

TABLE (2)

Store-Product Markdown Dollar Example

| Product | Store | Initial Price | Markdown Price | Markdown Volume | Markdown Dollar (store-product) |
|---|---|---|---|---|---|
| Product A | Store A | $2.30 | $1.90 | 300 | $120.00 |
| Product A | Store B | $2.70 | $2.30 | 280 | $112.00 |
| Product B | Store A | $4.30 | $3.90 | 200 | $ 80.00 |
| Product B | Store B | $4.70 | $4.30 | 180 | $ 72.00 |

As can be seen from Table (2), the markdown dollar, which again represents cost or lost-revenue for a current markdown in a set or sequence of markdowns over time, is determined across a set of all store-product combinations (again, potentially millions in actual processing). For the Product A/Store A combination, the initial price is again two dollars and thirty cents ($2.30) (which is the same as the initial price in the previous example), with a (current) markdown price of one dollar and ninety cents ($1.90), which represents a forty cent ($0.40) markdown from the initial price. The markdown volume at this (current) markdown price is predicted to be three hundred (300) units of Product A in Store A, and if all are sold the (current) markdown dollar, which again is the cost of the markdown, is one hundred and twenty dollars ($120.00). Similar analysis may be applied to the other store-product combinations within Table (2).

Further, for purposes of the description of the value densities further below, it is noted that the sum/total of the markdown dollar is equal to three hundred and eighty-four dollars ($384.00). This value is the sum of the far right column in Table (2) above.

Regarding calculation of the base objective value, the "base objective value" is defined as the value of the goal (e.g., the "goal" being a combination of profit, revenue, and volume) for each store-product using the markdown start price. As such, the base objective value is calculated based upon the base dollar described above as an initial starting point. The "goal" (objective) may include any of profit, revenue, and/or sales volume, as described in more detail below. The base objective value is again determined for the initial markdown start price.

The processing for this phase receives as input the markdown start price from the retailer, and predicts a base volume at the markdown start price. Again, the base objective value, cost, markdown start price, and base volume are store-product level values in granularity and represent a very large data set for processing using the technology described herein. Again, the summations (e.g., "Σ") for the equations described herein are across all store-products for a given retailer (very large data set).

The following Equation (3) represents processing that may be performed to determine the base objective value for a goal of maximizing profit.

$$\text{Base objective value} = \Sigma[(\text{markdown start price} - \text{cost of product}) * \text{base volume}] \quad \text{Equation (3):}$$
Profit Goal Base Objective Value Determination The following Equation (4) represents processing that may be performed to determine the base objective value for a goal of maximizing revenue.

$$\text{Base objective value} = \Sigma(\text{markdown start price} * \text{base volume}) \quad \text{Equation (4):}$$
Revenue Goal Base Objective Value Determination The following Equation (5) represents processing that may be performed to determine the base objective value for a goal of maximizing sales volume.

$$\text{Base objective value} = \Sigma(\text{base volume}) \quad \text{Equation (5):}$$
Sales Volume Goal Base Objective Value Determination The example below presumes the goal is to maximize profit, with the understanding that similar examples may be derived according to the description herein for each of revenue and sales volume goals.

The following Table (3) provides an example base objective value determination for a profit goal across two stores and two products for purposes of description, with the understanding that implementation of the present technology may include millions of store-product combinations:

TABLE (3)

Store-Product Base Objective Value Example

| Product | Store | Cost | Markdown Start Price | Base Volume | Base Objective Value (store-product) |
|---|---|---|---|---|---|
| Product A | Store A | $1.10 | $2.20 | 200 | $220.00 |
| Product A | Store B | $1.50 | $2.60 | 180 | $198.00 |
| Product B | Store A | $2.10 | $4.30 | 100 | $210.00 |
| Product B | Store B | $2.50 | $4.60 | 80 | $168.00 |

As can be seen from Table (3), the markdown start prices and base volumes are the same as in the example of Table (1) described above because the same store-product combinations are used. Further, the base objective value, which again represents the value of the respective goal (e.g., again profit in this example), is determined across a set of all store-product combinations (again, potentially millions in actual processing). For the Product A/Store A combination, the cost is one dollar and ten cents ($1.10), with a markdown start price again of two dollars and twenty cents ($2.20). The base volume is again two hundred (200) units of Product A in Store A, and if all units are sold the base objective value, which again is the value of the selected goal (e.g., profit), is two hundred and twenty dollars ($220.00). Similar analysis may be applied to the other store-product combinations within Table (3).

Further, for purposes of the description of the value densities further below, it is noted that the sum/total of the base objective value is equal to seven hundred and ninety-six dollars ($796.00). This value is the sum of the far right column in Table (3) above.

Regarding calculation of the markdown objective value, the "markdown objective value" is defined as the value of the goal (e.g., the "goal" being a combination of profit, revenue, and volume) for each store-product using the markdown recommendation. As such, the markdown objective value is calculated based upon the markdown dollar described above as an initial starting point. The "goal" (objective) may include any of profit, revenue, and/or sales volume, as described in more detail below. The markdown objective value is again determined for the respective markdown recommendation.

The processing for this phase receives as input the item costs from the retailer, optimizes the markdown price, and predicts a markdown volume at the respective markdown price. Again, the markdown objective value, cost, markdown price, and markdown volume are store-product level values in granularity and represent a very large data set for processing using the technology described herein. Again, the summations (e.g., "Σ") for the equations described herein are across all store-products for a given retailer (very large data set).

The following Equation (6) represents processing that may be performed to determine the markdown objective value for a goal of maximizing profit.

$$\text{Markdown objective value} = \Sigma[(\text{markdown price} - \text{cost}) * \text{markdown volume}] \quad \text{Equation (6):}$$
Profit Goal Markdown Objective Value Determination The following Equation (7) represents processing that may be performed to determine the markdown objective value for a goal of maximizing revenue.

$$\text{Markdown objective value} = \Sigma(\text{markdown price} * \text{markdown volume}) \quad \text{Equation (7):}$$
Revenue Goal Markdown Objective Value Determination The following Equation (8) represents processing that may be performed to determine the markdown objective value for a goal of maximizing sales volume.

$$\text{Markdown objective value} = \Sigma(\text{markdown volume}) \quad \text{Equation (8):}$$
Sales Volume Goal Markdown Objective Value Determination The example below presumes the goal is to maximize profit, with the understanding that similar examples may be derived according to the description herein for each of revenue and sales volume goals.

The following Table (4) provides an example markdown objective value determination for a profit goal across two stores and two products for purposes of description, with the understanding that implementation of the present technology may include millions of store-product combinations:

TABLE (4)

Store-Product Markdown Objective Value Example

| Product | Store | Cost | Markdown Price | Markdown Volume | Markdown Objective Value (store-product) |
|---|---|---|---|---|---|
| Product A | Store A | $1.10 | $1.90 | 300 | $240.00 |
| Product A | Store B | $1.50 | $2.30 | 280 | $224.00 |
| Product B | Store A | $2.10 | $3.90 | 200 | $360.00 |
| Product B | Store B | $2.50 | $4.30 | 180 | $324.00 |

As can be seen from Table (4), the markdown prices and markdown volumes are the same as in the example of Table (2) described above because the same store-product combinations are used. Further, the markdown objective value, which again represents the value of the respective goal (e.g., again profit in this example), is determined across a set of all store-product combinations (again, potentially millions in actual processing). For the Product A/Store A combination, the cost is one dollar and ten cents ($1.10), with a markdown price again of one dollar and ninety cents ($1.90). The markdown volume is again three hundred (300) units of Product A in Store A, and if all units are sold the markdown objective value, which again is the value of the selected goal (e.g., profit), is two hundred and forty dollars ($240.00). Similar analysis may be applied to the other store-product combinations within Table (4).

Further, for purposes of the description of the value densities further below, it is noted that the sum/total of the markdown objective value is equal to one thousand one hundred and forty-eight dollars ($1148.00). This value is the sum of the far right column in Table (4) above.

Regarding the detailed sequence of processing steps to select the store-product combinations for markdown, the examples below again presume profit to be the objective. However, it should be noted that similar processing to select items for markdown based upon a revenue goal and/or a volume goal may be performed, and the description below provides examples by which those additional types of processing may be performed.

The detailed sequence of processing steps to select the store-product combinations for markdown include a first step of filtering out store-products without a markdown recommendation, a second step of calculating a value density for each set of store-product combinations, a third step of sorting the respective value densities of the different store-product combinations in descending order, a fourth step of iteratively choosing store-product combinations by order and calculating total markdown dollars, and a fifth step of stopping the selection/choosing of store-product combinations for markdown when the total resulting markdown dollars exceed the markdown budget. The unselected/unchosen store-products will use the markdown start price instead of the markdown recommendation to preserve the markdown budget.

Regarding the first step of filtering out store-products without a markdown recommendation, in a given markdown optimization, there may be certain store-products for which no markdown recommendation is appropriate, such as for situations where the goal is profit. For example, if the elasticity of certain products is very low, the volume will not increase significantly even if the price is decreased considerably. For these types of inelastic products, if the retailers want maximum profit, no markdown recommendation will be provided. This results in no markdown dollars for these inelastic products, and these inelastic store-products may be filtered and not considered further in the processing described herein.

Regarding the second step of calculating a value density, several of the values determined above are taken as input. Specifically, the base dollar, the markdown dollar, the base objective value, and the markdown objective value are all inputs. Additionally, as described above, all of these are dimensionally determined at a store-product level of granularity (e.g., potentially millions of values), and as such, the resulting value density is also at the same store-product level of granularity from a dimensionality perspective.

The following Equation (9) represents processing that may be performed to determine the value density, again for a goal of maximizing profit.

$$\text{Value Density} = (\text{markdown objective} - \text{base objective}) / (\text{markdown dollar} - \text{base dollar}) \quad \text{Equation (9):}$$
Profit Goal Value Density Determination The example below presumes the goal is to maximize profit, with the understanding that similar examples may be derived according to the description herein for each of revenue and sales volume goals.

The following Table (5) provides an example value density determination for a profit goal across several product groups, with the product group processed according to the above data transformations represented within the first row as "Group (1)." Data for the other store-product groups is presumed to have been derived according to the processing described above for purposes of selecting product groups according to the markdown budget. Again, it is understood that implementation of the present technology may include millions of store-product combinations within each product group:

TABLE (5)

Store-Product Value Density Example

| Store-Product Groups | Markdown Objective | Base Objective | Markdown Dollar | Base Dollar | Value Density (store-product) |
|---|---|---|---|---|---|
| Group(1) | $1148 | $796 | $384 | $46 | 1.04 |
| Group(2) | $1200 | $850 | $400 | $60 | 1.03 |
| Group(3) | $1100 | $750 | $300 | $50 | 1.40 |
| Group(4) | $1000 | $700 | $200 | $40 | 1.88 |

As can be seen from Table (5), the first row represents the sums/totals of the markdown objective, base objective, markdown dollar, and base dollar for Group(1) described above and as derived from the last columns of each of Table (1) through Table (4). As described above, the additional rows represent additional store-product groups derived according to the processing described above for Group(1), and this additional processing is omitted for brevity, with the understanding that one of skill may derive values for additional product groupings based upon the description above.

These rows of information are shown as "Group(1)" through "Group(4)" for ease of reference in the following examples. The value density in each row of Table (5) is derived according to Equation (9) above using the values in the respective row.

Regarding the third step of sorting the value density in descending order, the following Table (6) provides an example of sorting the value density determinations of Table (5) in descending order:

TABLE (6)

Sorted Descending Store-Product Value Density Example

| Store-Product | Markdown Objective | Base Objective | Markdown Dollar | Base Dollar | Value Density (store-product) |
|---|---|---|---|---|---|
| Group(4) | $1000 | $700 | $200 | $40 | 1.88 |
| Group(3) | $1100 | $750 | $300 | $50 | 1.40 |
| Group(1) | $1148 | $796 | $384 | $46 | 1.04 |
| Group(2) | $1200 | $850 | $400 | $60 | 1.03 |

As can be seen from Table (6), Group(4) has the highest value density, and is listed at the top of Table (6), with the remaining combinations listed in descending order according to their respective value densities.

Regarding the fourth step of choosing the store-products by order and calculating total markdown dollars, several of the values determined above are taken as input. Specifically, the base dollar and the markdown dollar are inputs. Additionally, as described above, these are dimensionally determined at a store-product level of granularity (e.g., potentially millions of values), and as such, the resulting value density is also at the same store-product level of granularity from a dimensionality perspective. The total markdown dollar is determined and represents a value across all store-products (all stores and all products).

The following Equation (10) represents processing that may be performed to determine the total markdown dollar.

Total Markdown Dollar=markdown dollar(selected store-products)+base dollar (non-selected store-products) Equation (9): Total Markdown Dollar Determination The following Table (7) provides an example total markdown dollar determination for a sequence of additions of store-product groups for markdown in descending order according to their respective value densities. As such, Group (4) is initially selected for markdown (first row of Table (7)), then Group(4) plus Group(3) (e.g., Group(4+3) in Table (7)) are selected for markdown (second row), and this processing continues through the remaining rows of Table (7). For purposes of the following example, it is presumed that a markdown budget dollar from the retailer is one thousand dollars ($1,000), though it is understood that when implemented the markdown dollar may be much larger across the store-product combinations in a given implementation.

TABLE (7)

Total Markdown Dollar Example (All Stores)

| Store-Product Groups | Markdown Dollar | Base Dollar | Total Markdown Dollar |
|---|---|---|---|
| Group(4) | $200 | $40 | $200 + $50 + $46 + 60 = $356 |
| Group(4 + 3) | $300 | $50 | $200 + $300 + $46 + 60 = $606 |
| Group(4 + 3 + 1) | $384 | $46 | $200 + $300 + $384 + 60 = $944 |
| Group(4 + 3 + 1 + 2) | $400 | $60 | $200 + $300 + $384 + 60 = $1,284 |

As can be seen from Table (7), the third row with Group(4+3+1) yields a total markdown dollar of nine hundred and forty-four dollars ($944), while the fourth row Group(4+3+1+2) yields a total markdown dollar of one thousand two hundred and eighty-four dollars ($1,284).

Regarding the fifth step of stopping the selection/choosing of store-products for markdown when the total resulting markdown dollars exceed the markdown budget, the third row represents a set of store-products that satisfy (stay within) the markdown budget of one thousand dollars ($1,000) within this example. Accordingly, processing operates to select/choose store-product Group(4), Group(3), and Group(1) to be recommended by the system to use the respective markdown recommendations, while the Group(2) store-products will be recommended to use the respective markdown start price. As such, the unselected/unchosen store-products (groups) will use the markdown start price instead of the markdown recommendation to preserve the markdown budget.

The technology described herein also provides a new user interface (UI) for retailers. A new text box is provided to allow the retailer to enter the value of the retailer's total markdown budget. When the retailer creates a new pricing scenario, they may choose to enter the value into this text box. If the value of markdown budget is not entered, the markdown budget may be considered unlimited for execution of the markdown optimization.

New outputs may also be provided to the retailers. After optimization, some new information will display within a UI report for retailers. On the page of the main report, the total markdown dollars for all chosen and unchosen store-products for markdown will display. On a subpage for any given single store-product, its value density will display, its markdown dollar and base dollar will display, and its markdown objective value and base objective value will also display. A default may be provided to hide this information, so that the user may query this information if appropriate. Additionally, on the respective subpage for any given single store-product, if the store-product has no markdown recommendation due to the total markdown budget, an indication may be provided that no markdown recommendation is specified. Alternatively, if a markdown recommendation is specified for the respective store-product, then the markdown recommendation for that store-product may be specified.

As such, the user interface for a retailer provides a detailed set of outputs including the results of the data transformations described above. A retailer's pricing efficiency may be improved, along with management of total markdown dollars.

It should be noted as introduced above that conception of the present subject matter resulted from recognition of certain limitations associated with conventional computing platforms and an inability of these prior platforms to perform certain types of computations. For example, it was observed that a retailer may have hundreds of stores across which they have a million store-product combinations of items for which they want to price according to a markdown budget constraint as defined herein. However, it was determined that attempting to perform a markdown optimization across all store-products (e.g., millions) for this very large set of store-product combinations creates a complex data processing challenge. It was determined that conventional computers and processing capabilities/techniques are incapable of performing this form of large-scale data processing, and that new technology and processing solutions were needed to improve computational processing. The technology described herein solves this recognized computing problem by providing a new technique of data manipulation and data transformation within a new large-scale computing platform to derive data optimizations across this very large data set of individual store-product combinations. The technology described herein solves this large-data problem that is not supported by previous computing platforms. The present subject matter improves retail pricing for large sets of store-products by providing for constrained large-data markdown optimizations based upon markdown budget, as described above and in more detail below. As such, improved computational processing of large sets of store-product combinations may be obtained through use of the present technology.

The constrained large-data markdown optimizations based upon markdown budget described herein may be performed in real time. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additionally, the present technology may be implemented within or as part of a cloud computing environment (e.g., for data analytics), or may be implemented as a customized retail-environment specific solution. Examples of implementation within a cloud computing environment are described below, with the understanding that an embedded device with circuitry designed specifically to perform the processing described herein may utilized to perform the processing described herein as appropriate for a given implementation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
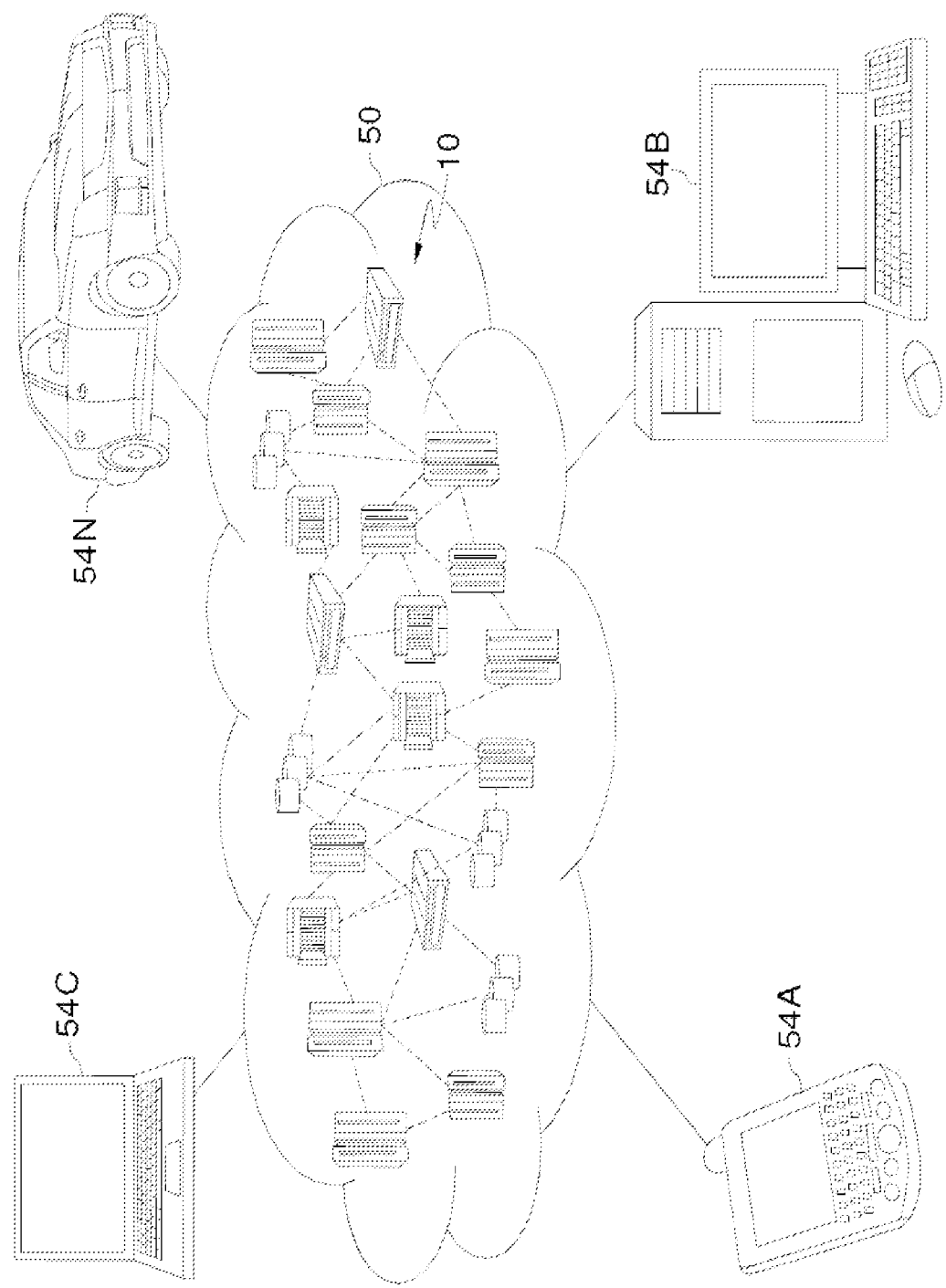
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
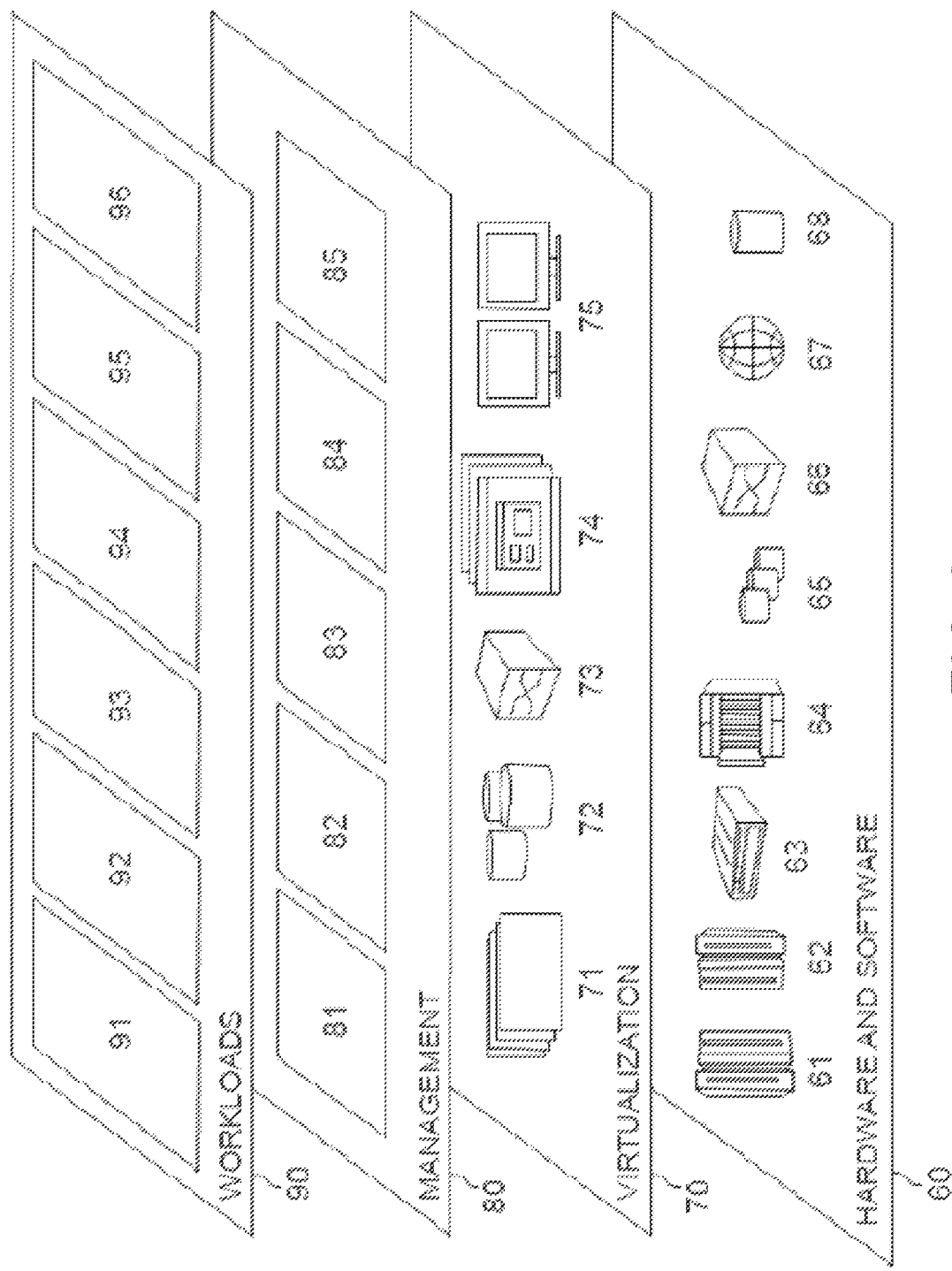
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and constrained large-data markdown optimizations based upon markdown budget 96.

Regarding alternative implementation options, it should be understood that the various alternatives may be combined with or substituted with the implementation options described above, as appropriate for the given implementation. Many such alternatives are possible, and all such alternatives are considered within the scope of the present technology.

Figure 5:
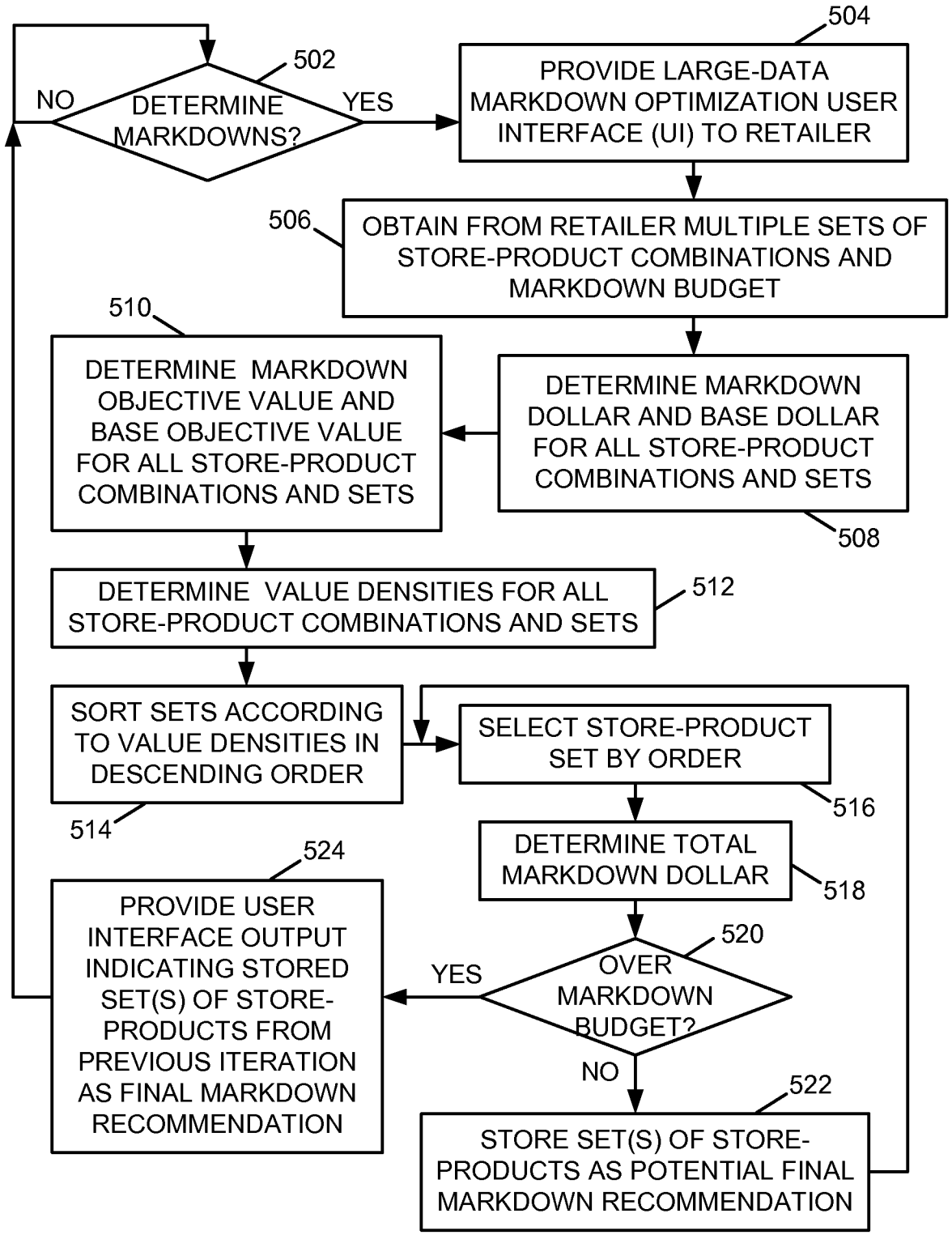
FIG. 5 is a flow chart of an example of an implementation of a process for constrained large-data markdown optimizations based upon markdown budget that iteratively accumulates a markdown recommendation according to an embodiment of the present subject matter.

FIG. 4 through FIG. 5 described below represent example processes that may be executed by devices, such as those described above, to perform the automated constrained large-data markdown optimizations based upon markdown budget associated with the present subject matter. Many other variations on the example processes are possible and all are considered within the scope of the present subject matter. The example processes may be performed by devices, such as the cloud computing node 10. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for constrained large-data markdown optimizations based upon markdown budget. The process 400 represents a processor-implemented method of performing the processing described herein. At block 402, the process 400 provides a markdown budget user interface that implements access to large-scale computational resources capable of concurrently manipulating each of a plurality of multi-million item data sets and that allows a retailer to specify inputs comprising a markdown budget constraint that applies across all retailer stores, a plurality of store-product data sets that each comprise initial prices and markdown start prices of different combinations of products within all of the retailer stores, and a markdown objective selected from a group consisting of profit, revenue, and sales volume to be maximized within the markdown budget constraint. At block 404, the process 400 receives from the retailer via the markdown budget user interface the inputs comprising the markdown budget constraint, the plurality of store-product data sets, and the markdown objective. At block 406, the process 400 invokes the large-scale computational resources via the markdown budget user interface to determine a markdown recommendation that comprises an indication of the store-product data sets that satisfy both the markdown budget constraint and the markdown objective. At block 408, the process 400 provides, to the retailer via the markdown budget user interface, the markdown recommendation that comprises the indication of the store-product data sets that satisfy both the markdown budget constraint and the markdown objective.

FIG. 5 is a flow chart of an example of an implementation of a process 500 for constrained large-data markdown optimizations based upon markdown budget that iteratively accumulates a markdown recommendation. The process 500 represents a computer-implemented method of performing the processing described herein. At decision point 502, the process 500 makes a determination as to whether a request to determine markdown optimizations has been detected. A request to determine markdown optimizations may be received, for example, from a retailer by the retailer invoking/starting a large-data markdown optimization application. In response to determining that a request to determine markdown optimizations has been received, the process 500 provides a large-data markdown optimization user interface (UI) to the retailer at block 504. The large-data markdown optimization UI allows the retailer to upload large data sets that include store-product combinations across all stores in multiple different categories. At block 506, the process 500 obtains from the retailer multiple large data sets that include store-product combinations across all stores in multiple different categories and a markdown budget specified by the retailer.

As described above, the processing involved to perform the technology described herein would not be possible by use of conventional computing devices. As such, the large-data markdown optimization UI interfaces with cloud computing technology as described above to perform the processing described herein. All processing for calculations and data transformations described below may be performed in parallel across all sets of store-product combinations using multiple cloud computing resources.

As such, at block 508 the process 500 begins concurrent processing of all of the received data sets by determining a markdown dollar and a base dollar for all store-product combinations and sets. At block 510, the process 500 determines a markdown objective value and a base objective value for all store-product combinations and sets.

At block 512, the process 500 determines value densities for all store-product combinations and sets. At block 514, the process 500 sorts in descending order according to their respective value densities the respective sets of store-product combinations.

At block 516, the process 500 begins iterative processing to determine a final markdown recommendation from the multiple sets of store-product combinations and selects a store product by order according to the respective value densities, beginning first with the store-product combination with the highest value density. At block 518, the process 500 determines the total markdown dollar for the selected store-product combinations, again starting in the first iteration with the one store-product combination with the highest value density.

At decision point 520, the process 500 makes a determination as to whether the total markdown dollar according to the selected set(s) of store-product combinations exceeds the markdown budget specified by the retailer. For purposes of description, it is presumed that the first set of store-product combinations does not exceed the markdown budget. As such, at block 522 the process 500 stores the set(s) of store-products as a potential final markdown recommendation. Again, during the first iteration, the one store-product combination with the highest value density is stored, with subsequent iterations potentially adding to the set(s) of store-product combination up to the specified markdown budget. It should be noted that the process 500 may be configured not to exceed the markdown budget with a markdown recommendation or the retailer may be allowed to specify a percentage overage to allow for some flexibility in the markdown recommendation.

The process 500 returns to block 516 and selects the next store-product set according to the next store-product set in the ordered list of store-product sets sorted according to the value densities. As such, the process 500 iteratively accumulates store-product sets with the highest value densities to include within a final markdown recommendation that targets but does not exceed the specified markdown budget. The process 500 iterates as described above.

Returning to the description of decision point 520, in response to determining that the total markdown dollar according to the selected set(s) of store-product combinations exceeds the markdown budget specified by the retailer, the process 500 provides user interface output including the stored set(s) of store-product combinations from the previous iteration (that was below the markdown budget) as the final markdown recommendation. The process 500 returns to decision point 502.

As such, the process 500 provides a user interface to a cloud computing environment that concurrently processes large data sets to derive markdown recommendations. The process 500 receives from a retailer as input multiple store-product groupings/sets that may each include store-product combinations across all stores (large data sets). The process 500 also receives from the retailer a markdown budget. The process 500 ranks the sets of store-product combinations according to determined value densities that represent overall values of marking down the respective categories/sets of store products. The process 500 iteratively selects sets of store-products starting with the highest ranked value densities and continuing down the ordered list until the markdown budget is achieved. The process 500 provides to the retailer via the user interface to the cloud computing environment a final markdown recommendation that includes the sets of store-products that satisfy and do not exceed the markdown budget.

As described above in association with FIG. 1 through FIG. 5, the example systems and processes provide constrained large-data markdown optimizations based upon markdown budget. Many other variations and additional activities associated with constrained large-data markdown optimizations based upon markdown budget are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
  providing a markdown budget user interface that implements access to large scale computational resources capable of concurrently manipulating each of a plurality of multi-million item data sets and that allows a retailer to specify inputs comprising:
    (1) a markdown budget constraint that specifies a total markdown amount to be distributed across all retailer stores and for which a markdown recommendation is to be specified for a planned set of price reductions;
    (2) a plurality of store-product data set of different combinations of products within all of the retailer stores, where the store-product data sets each comprise (i) initial prices and (ii) markdown start prices specified as an initial markdown applied relative to the initial prices and from which to begin markdown analysis of each of the different combinations of products within all of the retailer stores; and (3) a markdown objective to be maximized across a set of scheduled markdown intervals over time and selected from a group consisting of profit, revenue, and sales volume within the markdown budget constraint;

receiving from the retailer via the markdown budget user interface the inputs comprising the markdown budget constraint, the plurality of store-product data sets, and the markdown objective;

invoking the large-scale computational resources across all of the retailer stores via the markdown budget user interface to determine the markdown recommendation that comprises an indication of the store-product sets, with each store product data set specifying one individual store selected from all the retailer stores and one individual product selected from products of the respective specified individual store, that collectively satisfy both the markdown budget constraint and the markdown objective to be maximized across the set of scheduled markdown intervals over time, where invoking the large-scale computational resources across all of the retailer stores via the markdown budget user interface to determine the markdown recommendation comprises:

(1) determining the markdown recommendation by invoking the large-scale computational resources via the markdown budget user interface;

(2) determining, concurrently via the markdown budget user interface for each of the plurality of store-product data sets by use of the large-scale computational resources, a value density that specifies an effectiveness of the respective store-product data set at contributing to the markdown objective to be maximized across the set of scheduled markdown intervals over time and selected from the group consisting of profit, revenue, and sales volume within the markdown budget constraint;

(3) ranking within the markdown budget user interface the store-product data sets in decreasing order according to the respective determined value densities; and (4) iteratively adding within the markdown budget user interface the store-product data sets from the ranked decreasing order until both the markdown budget constraint and the markdown objective are satisfied; and providing, to the retailer via the markdown budget user interface, the markdown recommendation that comprises the indication of the store product data sets of the different combinations of products within all of the retailer stores that satisfy both the markdown budget constraint and the markdown objective to be maximized across the set of scheduled markdown intervals over time.

2. The computer-implemented method of claim 1, further comprising, for each store-product data set:

determining a base objective, where the base objective is a value of a goal for the store-product data set utilizing the markdown start price;

determining a markdown dollar, where the markdown dollar represents a cost or lost revenue for a given markdown in a set or sequence of markdowns for the store-product data set over a threshold period of time;

determining a base dollar, where the base dollar represents a currency value associated with sales between the markdown start price of the store-product data set and a base normal price, where the base dollar further represents a predicted reduction in sales; and where the determining of the value density is based, at least in part, on (i) the markdown objective, (ii) the base objective, (iii) the markdown dollar, and (iv) the base dollar.

3. The computer-implemented method of claim 2, where determining the value density includes calculating a quotient of the markdown objective minus the base objective and the markdown dollar minus the base dollar.

4. The computer-implemented method of claim 1, where the markdown recommendation comprises a markdown schedule with scheduled markdown across the set of scheduled markdown intervals over time for the store-product data sets that satisfy both the markdown budget constraint and the markdown objective to be maximized across the set of scheduled markdown intervals over time.

5. The computer-implemented method of claim 1, further comprising:

predicting, via the markdown budget user interface and the large-scale computational resources, a markdown sales volume associated with each store-product data set indicated within the markdown recommendation; and providing the predicted markdown sales volume with the markdown recommendation via the markdown budget user interface.

6. The computer-implemented method of claim 1, where the large-scale computational resources capable of concurrently manipulating the each of the plurality of multi-million data sets comprise resources within a cloud computing environment.

7. The computer-implemented method of claim 1, where the markdown budget user interface is provided as a service in a cloud computing environment.

8. A system, comprising:

a communication module; and a processor programmed to:

provide a markdown budget user interface that implements access to large scale computational resources capable of concurrently manipulating each of a plurality of multi-million item data sets and that allows a retailer to specify inputs comprising:

(1) a markdown budget constraint that specifies a total markdown amount to be distributed across all retailer stores and for which a markdown recommendation is to be specified for a planned set of price reductions;

(2) a plurality of store-product data set of different combinations of products within all of the retailer stores, where the store-product data sets each comprise (i) initial prices and (ii) markdown start prices specified as an initial markdown applied relative to the initial prices and from which to begin markdown analysis of each of the different combinations of products within all of the retailer stores; and (3) a markdown objective to be maximized across a set of scheduled markdown intervals over time and selected from a group consisting of profit, revenue, and sales volume within the markdown budget constraint;

receive from the retailer via the markdown budget user interface the inputs comprising the markdown budget constraint, the plurality of store-product data sets, and the markdown objective;

invoke the large-scale computational resources across all of the retailer stores via the markdown budget user interface to determine the markdown recommendation that comprises an indication of the store-product sets, with each store product data set specifying one individual store selected from all the retailer stores and one individual product selected from products of the respective specified individual store, that collectively satisfy both the markdown budget constraint and the markdown objective to be maximized across the set of scheduled markdown intervals over time, where invoking the large-scale computational resources across all of the retailer stores via the markdown budget user interface to determine the markdown recommendation comprises:

(1) determining the markdown recommendation by invoking the large-scale computational resources via the markdown budget user interface;

(2) determining, concurrently via the markdown budget user interface for each of the plurality of store-product data sets by use of the large-scale computational resources, a value density that specifies an effectiveness of the respective store-product data set at contributing to the markdown objective to be maximized across the set of scheduled markdown intervals over time and selected from the group consisting of profit, revenue, and sales volume within the markdown budget constraint;

(3) ranking within the markdown budget user interface the store-product data sets in decreasing order according to the respective determined value densities; and (4) iteratively adding within the markdown budget user interface the store-product data sets from the ranked decreasing order until both the markdown budget constraint and the markdown objective are satisfied; and provide, to the retailer via the markdown budget user interface, the markdown recommendation that comprises the indication of the store product data sets of the different combinations of products within all of the retailer stores that satisfy both the markdown budget constraint and the markdown objective to be maximized across the set of scheduled markdown intervals over time.

9. The system of claim 8, the processor is programmed to, for each store-product data set:

determine a base objective, where the base objective is a value of a goal for the store-product data set utilizing the markdown start price;

determine a markdown dollar, where the markdown dollar represents a cost or lost revenue for a given markdown in a set or sequence of markdowns for the store-product data set over a threshold period of time;

determine a base dollar, where the base dollar represents a currency value associated with sales between the markdown start price of the store-product data set and a base normal price, where the base dollar further represents a predicted reduction in sales; and where the determining of the value density is based, at least in part, on (i) the markdown objective, (ii) the base objective, (iii) the markdown dollar, and (iv) the base dollar.

10. The system of claim 9, where determining the value density includes calculating a quotient of the markdown objective minus the base objective and the markdown dollar minus the base dollar.

11. The system of claim 8, where the markdown recommendation comprises a markdown schedule with scheduled markdowns across the set of scheduled markdown intervals over time for the store-product data sets that satisfy both the markdown budget constraint and the markdown objective to be maximized across the set of scheduled markdown intervals over time.

12. The system of claim 8, where the processor is further programmed to:

predict, via the markdown budget user interface and the large scale computational resources, a markdown sales volume associated with each store-product data set indicated within the markdown recommendation; and provide the predicted markdown sales volume with the markdown recommendation via the markdown budget user interface.

13. The system of claim 8, where the large-scale computational resources capable of concurrently manipulating the each of the plurality of multi-million item data sets comprise resources within a cloud computing environment, and the markdown budget user interface is provided as a service in the cloud computing environment.

14. A computer program product, comprising:

a computer readable storage medium having computer readable program code embodied therewith, where the computer readable storage medium is not transitory signal per se and where the computer readable program code when executed on a computer causes the computer to:

provide a markdown budget user interface that implements access to large scale computational resources capable of concurrently manipulating each of a plurality of multi-million item data sets and that allows a retailer to specify inputs comprising:

(1) a markdown budget constraint that specifies a total markdown amount to be distributed across all retailer stores and for which a markdown recommendation is to be specified for a planned set of price reductions;

(2) a plurality of store-product data set of different combinations of products within all of the retailer stores, where the store-product data sets each comprise (i) initial prices and (ii) markdown start prices specified as an initial markdown applied relative to the initial prices and from which to begin markdown analysis of each of the different combinations of products within all of the retailer stores; and (3) a markdown objective to be maximized across a set of scheduled markdown intervals over time and selected from a group consisting of profit, revenue, and sales volume within the markdown budget constraint;

receive from the retailer via the markdown budget user interface the inputs comprising the markdown budget constraint, the plurality of store-product data sets, and the markdown objective;

invoke the large-scale computational resources across all of the retailer stores via the markdown budget user interface to determine the markdown recommendation that comprises an indication of the store-product sets, with each store product data set specifying one individual store selected from all the retailer stores and one individual product selected from products of the respective specified individual store, that collectively satisfy both the markdown budget constraint and the markdown objective to be maximized across the set of scheduled markdown intervals over time, where invoking the large-scale computational resources across all of the retailer stores via the markdown budget user interface to determine the markdown recommendation comprises:

(1) determining the markdown recommendation by invoking the large-scale computational resources via the markdown budget user interface;

(2) determining, concurrently via the markdown budget user interface for each of the plurality of store-product data sets by use of the large-scale computational resources, a value density that specifies an effectiveness of the respective store-product data set at contributing to the markdown objective to be maximized across the set of scheduled markdown intervals over time and selected from the group consisting of profit, revenue, and sales volume within the markdown budget constraint;

(3) ranking within the markdown budget user interface the store-product data sets in decreasing order according to the respective determined value densities; and (4) iteratively adding within the markdown budget user interface the store-product data sets from the ranked decreasing order until both the markdown budget constraint and the markdown objective are satisfied; and provide, to the retailer via the markdown budget user interface, the markdown recommendation that comprises the indication of the store product data sets of the different combinations of products within all of the retailer stores that satisfy both the markdown budget constraint and the markdown objective to be maximized across the set of scheduled markdown intervals over time.

15. The computer program product of claim 14, the computer readable program code when executed on the computer further causes the computer to, for each store-product data set:

determine a base objective, where the base objective is a value of a goal for the store-product data set utilizing the markdown start price;

determine a markdown dollar, where the markdown dollar represents a cost or lost revenue for a given markdown in a set or sequence of markdowns for the store-product data set over a threshold period of time;

determine a base dollar, where the base dollar represents a currency value associated with sales between the markdown start price of the store-product data set and a base normal price, where the base dollar further represents a predicted reduction in sales; and determine of the value density is based, at least in part, on (i) the markdown objective, (ii) the base objective, (iii) the markdown dollar, and (iv) the base dollar.

16. The computer program product of claim 15, where determining the value density includes calculating a quotient of the markdown objective minus the base objective and the markdown dollar minus the base dollar.

17. The computer program product of claim 14, where the markdown recommendation comprises a markdown schedule with scheduled markdowns across the set of scheduled markdown intervals over time for the store-product data sets that satisfy both the markdown budget constraint and the markdown objective to be maximized across the set of scheduled markdown intervals over time.

18. The computer program product of claim 14, where the computer readable program code when executed on the computer further causes the computer to:

predict, via the markdown budget user interface and the large-scale computational resources, a markdown sales volume associated with each store-product data set indicated within the markdown recommendation; and provide the predicted markdown sales volume with the markdown recommendation via the markdown budget user interface.

19. The computer program product of claim 14, where the large-scale computational resources capable of concurrently manipulating the each of the plurality of multi-million item data sets comprise resources within a cloud computing environment.

20. The computer program product of claim 14, where the markdown budget user interface is provided as a service in a cloud computing environment.

* * * * *